US011912594B2

(12) United States Patent
Zou et al.

(10) Patent No.: US 11,912,594 B2
(45) Date of Patent: Feb. 27, 2024

(54) CARBON DISULFIDE-MODIFIED AMINE ADDITIVES FOR SEPARATION OF OIL FROM WATER

(71) Applicant: Baker Hughes, a GE company, LLC, Houston, TX (US)

(72) Inventors: Jian Zou, Sugar Land, TX (US); Bruce Oyer Horne, II, Sugar Land, TX (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 92 days.

(21) Appl. No.: 17/347,359

(22) Filed: Jun. 14, 2021

(65) Prior Publication Data

US 2021/0387877 A1    Dec. 16, 2021

Related U.S. Application Data

(60) Provisional application No. 63/039,706, filed on Jun. 16, 2020.

(51) Int. Cl.
| | |
|---|---|
| *C02F 1/68* | (2023.01) |
| *B01D 17/04* | (2006.01) |
| *C02F 103/10* | (2006.01) |
| *C02F 101/32* | (2006.01) |

(52) U.S. Cl.
CPC ............ *C02F 1/682* (2013.01); *B01D 17/047* (2013.01); *C02F 2101/32* (2013.01); *C02F 2103/10* (2013.01)

(58) Field of Classification Search
None
See application file for complete search history.

(56) References Cited

U.S. PATENT DOCUMENTS

| | | | |
|---|---|---|---|
| 4,253,970 | A | 3/1981 | Maher |
| 4,310,472 | A | 1/1982 | Buriks et al. |
| 4,855,060 | A | 8/1989 | Durham et al. |
| 5,247,087 | A | 9/1993 | Rivers |
| 5,248,449 | A | 9/1993 | Mitchell et al. |
| 5,500,133 | A | 3/1996 | Carey et al. |
| 5,543,056 | A | 8/1996 | Murcott et al. |
| 8,894,863 | B2 | 11/2014 | Soane et al. |
| 9,023,196 | B2 | 5/2015 | Cooper et al. |
| 9,181,497 | B2 | 11/2015 | Cooper et al. |
| 9,234,141 | B2 | 1/2016 | O'Rear et al. |
| 2003/0211951 | A1 | 11/2003 | Gatto |
| 2009/0127205 | A1 | 5/2009 | Sikes et al. |
| 2009/0272693 | A1 | 11/2009 | Mabille et al. |
| 2014/0263058 | A1 | 9/2014 | Fagher |
| 2014/0309410 | A1 | 10/2014 | Haider et al. |
| 2015/0197434 | A1 | 7/2015 | Zou et al. |
| 2016/0362316 | A1 | 12/2016 | Bara et al. |
| 2017/0274352 | A1 | 9/2017 | Bluemie et al. |
| 2018/0346356 | A1* | 12/2018 | Duttlinger, Jr. ......... C02F 1/385 |

FOREIGN PATENT DOCUMENTS

CN       1362373 A       8/2002

OTHER PUBLICATIONS

International Search Report and Written Opinion issued in connection with corresponding PCT Application No. PCT/US2021/037485 dated Oct. 8, 2021.
Barakat, M.A., "New trends in removing heavy metals from industrial wastewater", Arabian Journal of Chemistry, Jul. 2010, 361-377.
Swanson, Charles L., et al. "Mercury Removal from Waste Water with Starch Xanthate-Cationic Polymer Comples", Environmental Science & Technology, Jul. 1973, 614-619.
Wing, Robert E., et al., "Removal of Heavy Metals From Industrial Wastewaters Using Insoluble Starch Xanthate", EPA-600/2-78-085, May 1978, 118 pages.
Walterick, Gerald, et al., "Optimizing Mercury Removal Processes for Industrial Wasterwaters", GE Power & Water Technical Paper, Nov. 2012, 1-8.
Kim, Hyong-Tae, et al., "Application of Insoluble Cellulose Xanthate for the Removal of Heavy Metals from Aqueous Solution", Korean J. Chem. Eng. 16(3), Mar. 1999, 298-302.
EPA Capsule Report, "Aqueous Mercury Treatment", EPA/625/R-97/004, Jul. 1997, 38 pages.
Wing, R.E., "Emerging and Polishing Treatment Technologies for Removing Metals", American Electroplaters' Society, Inc., 1980, 1-23.
Swanson, C.L., et al., "Xanthation of Starch by a Continuous Process", I&EC Product Research & Development, Mar. 1964, 22-27.
Salam, Omar E. Abdel, et al., "A study of the removal characteristics of heavy metals from wastewater by low-cost adsorbents", Cairo University Journal of Advanced Research, Jan. 2011, 297-303.
Akintola, Oluwafemi S., et al., "Removal of mercury (II) via a novel series of cross-linked polydithiocarbamates", Journal of the Taiwan Institute of Chemical Engineers, Nov. 2015.
Wilhelm, S. Mark, et al., "Removal and Treatment of Mercury Contamination of Gas Processing Facilities", SPE 29721, Mar. 1985, 319-334.

(Continued)

*Primary Examiner* — Krishnan S Menon
(74) *Attorney, Agent, or Firm* — Crowe & Dunlevy, P.C.

(57) ABSTRACT

A carbon disulfide-modified amine additive may be introduced to an aqueous stream in an effective amount to separate oil from the water in the aqueous stream, such as separating at least some of the oil from emulsified oil-in-water in a production fluid, where the oil is crude oil. The carbon disulfide-modified amine additive may be produced from a reaction of synthetic amine, natural amines, or chemically modified natural amines with carbon disulfide and an α,β-unsaturated compound and/or an epoxide in one step. In one non-limiting embodiment, the amine is a natural amine or chemically modified natural amine of a polysaccharide containing amino functional group(s). Optionally, a base catalyst is used to make the carbon disulfide-modified amine additive.

12 Claims, No Drawings

(56) References Cited

OTHER PUBLICATIONS

Trimnell, D., et al., "Thiolation of Starch and Other Polysaccharides", Journal of Applied Polymer Science, vol. 17, 1973, 1607-1615.
Gallup, Darrell L., "Removal of mercury from water in the petroleum industry", Thermochem, Inc., Santa Rosa, CA, USA, date unknown, 1-15.
Abbott, Jim, et al., "Mercury removal technology and its application", Synetix, Belasis Av., Billingham, Cleveland, TS23 1LB, UK, date unknown, 9 pages.
Kahn, Adnan, et al., "Dithiocarbamated chitosan as a potent biopolymer for toxic cation remediation," Colloids and Surfaces B: Biointerfaces 87. (2011), 88-95.

* cited by examiner

CARBON DISULFIDE-MODIFIED AMINE ADDITIVES FOR SEPARATION OF OIL FROM WATER

CROSS-REFERENCE TO RELATED APPLICATION

This application claims the benefit of U.S. Provisional Patent Application Ser. No. 63/039,706 filed Jun. 16, 2020, incorporated herein by reference in its entirety.

TECHNICAL FIELD

The present invention relates to methods and additives for separation of oil contained within an aqueous stream, and more particularly relates, to adding carbon disulfide-modified amine additives to clarify a water-based stream, such as a production fluid from a subterranean oil well, for separating at least a portion of the oil from the water-based stream.

BACKGROUND

The increasing global demands for oil and potable water and tightening environmental requirements have increased the need for more effective treatment of oilfield streams containing oil/water mixtures and emulsions. In addition, increasingly stringent environmental regulations have driven up the need for more environment-friendly, less toxic additives for oil/water separation.

Many different processes and additives have been used to help remove or separate oil from the water-based streams accompanying or used in the production of oil and to make sure that such aqueous streams meet the standards set for discharge or reuse. For example, the reaction products of synthetic amines and carbon disulfide have long been used as water clarifiers for oil-in-water emulsions found in production fluids. However, these products have limited performance for water/oil separation and often generate solids when added to production fluids in the presence of heavy metals (e.g. iron), making the treatment and processing of these fluids more expensive and difficult.

U.S. Pat. No. 5,247,087 to Baker Hughes discloses that dithiocarbamic salts made from the reaction products of certain novel polyamines and carbon disulfide have been found to be useful to clarify water, particularly the oil-in-water emulsions which accompany crude oil production. The water clarification may be accomplished by demulsification or flocculation. The polyamine reaction products themselves are novel and may have the structure

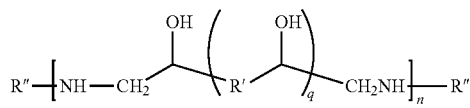

where R″ is selected from the group consisting of the structure —R—NH$_2$ and

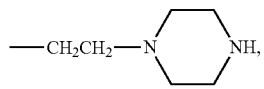

where R is selected from the group consisting of straight, branched or cyclic alkylene moieties; arylene moieties; substituted straight, branched or cyclic alkylene moieties; substituted arylene moieties or mixtures thereof; and where R' is —(CH$_2$)$_m$—O—R—O—(CH$_2$)$_m$— where n and m independently range from 1 to 5 and q is 0 or 1. The reaction products of this patent are made using a two-step process.

A method for treating water using natural polymers that provide an alternate and improved means to achieve enhanced coagulation is described in U.S. Pat. No. 5,543,056. A method for removing particles, color, and color from drinking water, comprising adding a primary coagulant such as a natural, cationic polymer like chitosan or a cationic starch and a coagulant aid such as bentonite to drinking water to form a mixture. A preferred concentration weight ratio of natural polymer to clay mineral is between 1:5 and 1:20. A composition for removing particles and color from drinking water is described that includes a natural, cationic polymer coagulant and clay mineral in a total amount effective to coagulate suspended material in the drinking water. The composition includes a weight ratio natural polymer coagulant/clay mineral of between about 1:5 to about 1:20.

Dithiocarbamic salts reported in literature showed performance as water clarifiers for oil-in-water emulsions found in production fluids. But some dithiocarbamic salts and their formulations generated solids during storage or when added to production fluids, making the handling or treatment and processing of these fluids more expensive and difficult. It would be desirable to develop better-performing, more cost-effective, more environmentally-friendly, and preferable more water-soluble additives for separating oil from water in streams containing oil/water mixtures.

SUMMARY

There is provided, in one form, a method for separating oil from water in an aqueous stream, where the method includes introducing an effective amount of a carbon disulfide-modified amine additive to the aqueous stream to separate at least a portion of oil from the water in the aqueous stream, and separating at least a portion of oil from the water in the aqueous stream.

There is further provided in another non-limiting embodiment, a treated aqueous stream that includes an aqueous stream comprising oil and water, and a carbon disulfide-modified amine additive in an amount from about 10 ppm to about 5000 ppm based on the treated aqueous stream.

DETAILED DESCRIPTION

It has been discovered that a carbon disulfide-modified amine additives are useful or effective for separating oil from water in an aqueous stream.

In one non-limiting embodiment, as shown in the Reaction 1 below, the carbon disulfide-modified amine useful for oil separation may be produced by reacting carbon disulfide (CS$_2$) with a synthetic amine, natural amine (e.g. chitin), or chemically modified natural amine (e.g. chitosan) and an epoxide compound in one step. The amines can be polymeric or non-polymeric. This reaction may be carried out at a temperature ranging from about −20° C. independently to about 200° C., alternatively from about 0° C. independently to about 150° C., in another non-limiting embodiment at temperature ranging from about 20° C. independently to about 60° C., and a pressure ranging from about 0.1 atmospheric pressure independently to about 1000 atmospheric pressure, alternatively from about 0.5 atmospheric pressure independently to about 5 atmospheric pressure, and in another non-limiting embodiment at ambient pressure. The reaction time may be completed within 0.1 independently to 72 hours, alternatively from within 1 independently to 24 hours, and in another non-limiting embodiment from about 4 independently to about 12 hours. The term "independently" as used herein with respect to a range means that any threshold may be used together with any other threshold to form an acceptable alternative range. A base catalyst may be or may not be present during the reaction. A polar solvent may be or may not be present during the reaction, e.g. water. In one non-restrictive embodiment, R may be an alkyl or aryl group, R' may be hydrogen, an alkyl group, or an aryl group, and R" may be hydrogen, an alkyl group, or an aryl group.

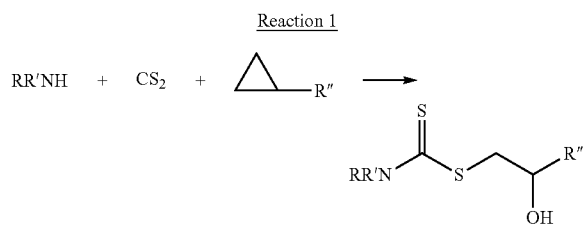

Reaction 1

The synthetic amines, natural amines, or chemically modified natural amines that may be reacted with the carbon disulfide include, without limitation, primary amines, secondary amines, benzylic amines, and/or aromatic amines. The amines can be polymeric or non-polymeric. Examples of amine reactants include, but are not limited to, organic compounds containing single or multiple amino groups such as piperidine, n-butylamine, and polymeric/oligomeric polyamine including polyethyleneimine (also known as polyethylenimine) and polyallylamine. As discussed in more detail later, the amine may also be a natural amine or chemically modified natural amine including, but not necessarily limited to, cationic polysaccharides containing amino functional groups including, without limitation, cationic starch, cationic cellulose, chitin, or chitosan. A natural amine is defined as one occurring in nature, for instance chitin $(C_8H_{13}O_5N)^n$, which is a long-chain polymer of N-acetylglucosamine, an amide derivative from glucose, which is a primary component of cell walls in fungi, the exoskeletons of arthropods, such as crustaceans and insects.

The epoxide compound in the reaction statement above include, without limitation, ethylene oxide, propylene oxide, 1,2-butene oxide, cyclohexene oxide, and styrene oxide. The molar ratio of carbon disulfide to the epoxide compound and the molar ratio of the carbon disulfide to the amino group on the amine may be adjusted to control the performance and solubility of the carbon disulfide-modified amine reaction product in water. In one embodiment, the molar ratio of carbon disulfide to the epoxide compound may range from about 1:100 independently to about 100:1, alternatively from about 1:1 independently to about 2:1. The molar ratio of carbon disulfide to the amino group on the amine may range from about 1:1,000,000 independently to about 100:1, alternatively from about 1:100 independently to about 1:2. Adjusting these ratios can improve water solubility of the carbon disulfide-modified amine additive.

In another non-limiting embodiment, the carbon disulfide-modified amine useful for oil/water separation may be produced by reacting carbon disulfide ($CS_2$) with a synthetic amine, natural amine, or chemically modified natural amine and an α,β-unsaturated compound, as shown in the reaction statement below in one step. The reaction may be in the presence of a polar solvent. This reaction may be carried out at a temperature ranging from a temperature ranging from about −20° C. independently to about 200° C., or from about 0° C. independently to about 150° C., and a pressure ranging from about 0.1 atmospheric pressure independently to about 1000 atmospheric pressure, or from about 0.5 atmospheric pressure independently to about 10 atmospheric pressure. In one non-restrictive embodiment, X may be COOR", COR", $CONH_2$, or CN, R may be an alkyl or aryl group, R' may be hydrogen, an alkyl group, or an aryl group.

Reaction 2

The α,β-unsaturated compounds used in the reaction above may include, without limitation, methyl acrylate, methyl, methacrylate, ethyl acrylate, 2-ethylhexyl acrylate, acrylonitrile, methyl vinyl ketone, cyclohexenone, and/or chalcone. The molar ratio of carbon disulfide to the α,β-unsaturated compound and the molar ratio of the carbon disulfide to the amino group on the amine may be adjusted to control the performance and solubility of the carbon disulfide-modified amine additive in water. In one embodiment, the molar ratio of carbon disulfide to the epoxide compound may range from about 1:100 independently to about 100:1, alternatively from about 1:1 independently to about 2:1. The molar ratio of carbon disulfide to the amino group on the amine may range from about 1:1,000,000 independently to about 100:1, alternatively from about 1:100 independently to about 1:2.

In yet another non-limiting embodiment, the carbon disulfide-modified amine additive useful for oil/water separation may be produced by reacting carbon disulfide ($CS_2$) with a polysaccharide containing amino functional group(s) and a base in the presence of a polar solvent. This reaction may be carried out, in one embodiment, at a temperature ranging from about −20° C. independently to about 200° C., or from about 0° C. independently to about 150° C., in another non-limiting embodiment at temperature ranging from about 20° C. independently to about 60° C., and a pressure ranging from about 0.1 atmospheric pressure independently to about 1000 atmospheric pressure, or from about 0.5 atmospheric pressure independently to about 10 atmospheric pressure, and in another non-limiting embodiment at ambient pressure.

As defined herein, natural amines and chemically modified natural amines include, but are not necessarily limited to, polysaccharides containing amino functional groups that may be reacted with the carbon disulfide include, without limitation, cationic starch, cationic cellulose, chitin, or chitosan. The molar ratio of carbon disulfide to the amine group on the polysaccharide may be adjusted to control the performance and solubility of the carbon disulfide-modified amine additive in water. In one embodiment, the molar ratio of carbon disulfide to the amino group on the polysaccharide may range from about 1:1,000,000 independently to about 100:1, alternatively from about 1:100 independently to about 1:2. In one non-limiting embodiment, "chemically modified" in this context means that the chemically modified compound has at least one nitrogen-containing moiety. Alternatively, the chemically modified compound has at least one amine moiety. In another non-restrictive version, a "chemically modified natural amine" is defined as a natural amine treated with a base, e.g. KOH or NaOH, in a non-limiting example chitin is treated with a base overnight to give chitosan; or in another non-restrictive example, treatment with starch that have —OH groups (hydroxyl groups groups).

Non-limiting examples of the bases that may be used as the optional catalyst in the reactions described above include, but are not necessarily limited to sodium hydroxide, potassium hydroxide, ammonia, sodium ethylate, sodium methylate, sodium carbonate, or sodium bicarbonate, and/or combinations of these. The optional polar solvent that can be present during the reaction can be any known polar solvent, including, but not necessarily limited to, water, methanol, ethanol, t-butanol, t-propanol, dimethylformamide (DMF), dimethyl sulfoxide (DMSO), tetrahydrofuran (THF), propylene carbonate, and/or combinations of these.

In a non-restrictive embodiment, the carbon disulfide-modified amine resulting from this reaction useful for separating oil from water in aqueous stream can be a polymeric dithiocarbamate and/or a polymeric dithiocarbamic salt.

It is important that the carbon disulfide-modified amine additive is made by a process of reacting the reactants together in one step; that is, in one reactor, one vessel, or one "pot". This is in contrast to using two steps such as the process of U.S. Pat. No. 5,247,087 previously mentioned. Conducting the reaction in one step is faster and easier compared to a two-step process. A goal of the reaction is to improve the water solubility of the carbon disulfide-modified amine additive reaction product by incorporating one or more hydroxyl group into the additive. In a non-limiting example, this can be done by reacting one mole of an epoxide, such as propylene oxide, per mole of the dithiocarbamate (reaction product of the amine and $CS_2$). The incorporation of one or more hydroxyl group into the carbon disulfide-modified amine additive gives improved water solubility, which makes the additive more effective to separate oil from water. In general, the more hydroxyl groups present in the additive molecule, the more water soluble the additive molecule is.

The aqueous stream to be treated with the carbon disulfide-modified amine of the present disclosure may be any stream containing a mixture of oil and water in which more than 80% by volume of the stream is made up of brine, seawater, or potable water (i.e. any stream that is more than 80% by volume water) in one non-limiting embodiment. Examples of such streams in the oilfield environment in which it would be beneficial to separate the oil from the water include, but are not necessarily limited to, a production fluid and wastewater from refineries or petrochemical plants. In a non-restrictive embodiment, the aqueous stream is a production fluid containing a mixture of crude oil and water.

The oil to be separated from the water in the aqueous stream may be dispersed within the water phase of the aqueous stream or emulsified in oil-in-water emulsions in the aqueous stream (reverse emulsions). It is also expected that water-in-oil emulsions may be treated with the methods and additives described herein.

A goal of the method is to separate the oil from the water in the aqueous stream to maximize oil recovery and to clarify the water in the aqueous stream to an acceptable level for the aqueous stream to be discharged to the environment or reused. While complete separation of the oil from the water in the aqueous stream is desirable, it should be appreciated that complete separation is not necessary for the methods discussed herein to be considered effective. Success is obtained if more oil is separated from the water in the aqueous stream using an effective amount of the carbon disulfide-modified polymer additive of the present disclosure than in the absence of it. In one non-limiting embodiment, the method is considered successful if oil is separated from water more efficiently or effectively using the carbon disulfide-modified amine additives described herein which contain hydroxyl group(s) as compared to an otherwise identical additive without the hydroxyl group(s). In an exemplary embodiment, the effective amount of carbon disulfide-modified polymer additive for purposes of separating oil from water in an aqueous stream, as these terms are defined herein, ranges from about 10 ppm independently to about 5000 ppm (by volume); alternatively from about 10 ppm independently to about 500 ppm.

In a non-limiting embodiment, the separation of the oil from the water using the carbon disulfide-modified amine may be accomplished by, as non-limiting examples, demulsification, flocculation, coagulation, gravity settling, electrostatic coalescence, and combinations thereof.

In another non-limiting embodiment, other additives may be added to the aqueous stream for treatment including, but not necessarily limited to, coagulants, flocculants, and mixtures thereof.

In the foregoing specification, the invention has been described with reference to specific embodiments thereof, and has been described as effective in providing methods and treatments for removing contaminants from a wastewater stream. However, it will be evident that various modifications and changes can be made thereto without departing from the broader scope of the invention as set forth in the appended claims. Accordingly, the specification is to be regarded in an illustrative rather than a restrictive sense. For example, aqueous streams, amines, α,β-unsaturated compounds, epoxides, polysaccharides, bases, solvents, chemical reaction conditions, reactant structure and properties, arrangement of oil within the aqueous stream, amounts of additive, and separation processes falling within the claimed parameters, but not specifically identified or tried in a particular composition or method, are expected to be within the scope of this invention.

The present invention may suitably comprise, consist or consist essentially of the elements disclosed and may be practiced in the absence of an element not disclosed. For instance, the method may comprise, consist of, or consist essentially of introducing an effective amount of a carbon disulfide-modified amine additive to the aqueous stream to separate at least a portion of oil from the water in the aqueous stream, and separating at least a portion of oil from the water in the aqueous stream. The $CS_2$-modified amine additive is made by a process comprising, consisting essentially of, or consisting of reacting together an amine selected from the group consisting of synthetic amines, natural amines, chemically modified natural amines, and combinations thereof, carbon disulfide, and a co-reactant selected from the group consisting of an epoxide, an α,β-unsaturated compound, and combinations thereof, optionally in the presence of a base catalyst, and optionally in the presence of a polar solvent.

Alternatively, the treated aqueous stream may comprise, consist essentially of, or consist of an aqueous stream containing oil and water; and from about 10 ppm to about 5000 ppm of an additive comprising, consisting of, or consisting essentially of a carbon disulfide-modified amine additive.

The words "comprising" and "comprises" as used throughout the claims, are to be interpreted to mean "including but not limited to" and "includes but not limited to", respectively.

As used herein, the singular forms "a," "an," and "the" are intended to include the plural forms as well, unless the context clearly indicates otherwise.

As used herein, the term "about" in reference to a given parameter is inclusive of the stated value and has the meaning dictated by the context (e.g., it includes the degree of error associated with measurement of the given parameter).

As used herein, the term "and/or" includes any and all combinations of one or more of the associated listed items.

What is claimed is:

1. A method for separating oil from water in an aqueous stream comprising oil and water, the method comprising:
    making a carbon disulfide-modified amine additive by a process comprising reacting together in one step:
        an amine selected from the group consisting of synthetic amines, natural amines, chemically modified natural amines, and combinations thereof;
        carbon disulfide; and
        a co-reactant selected from the group consisting of an epoxide, an α,β-unsaturated compound, and combinations thereof,
            wherein if the co-reactant is an epoxide, it is selected from the group consisting of ethylene oxide, propylene oxide, 1,2-buteneoxide, cyclohexene oxide, styrene oxide and combinations thereof; and
            where if the co-reactant is an α,β-unsaturated compound, it is selected from the group consisting of methyl acrylate, methyl, methacrylate, ethyl acrylate, 2-ethylhexyl acrylate, acrylonitrile, methyl vinyl ketone, cyclohexenone, chalcone, and combinations thereof;
    optionally in the presence of a base catalyst selected from a group consisting of sodium hydroxide, potassium hydroxide, ammonia, sodium ethylate, sodium methylate, sodium carbonate, sodium bicarbonate, and combinations thereof; and
    introducing an effective amount of the carbon disulfide-modified amine additive to the aqueous stream to separate at least a portion of oil from the water in the aqueous stream; and
    separating at least a portion of oil from the water in the aqueous stream.

2. The method of claim 1, where the amine is a natural amine or chemically modified natural amine comprising a cationic polysaccharide selected from a group consisting of cationic starch, cationic cellulose, chitin, chitosan, and combinations thereof.

3. The method of claim 1, where the aqueous stream comprises more than 80 vol % water.

4. The method of claim 1, where the aqueous stream comprises emulsified oil-in-water.

5. The method of claim 1, where the oil in the aqueous stream is crude oil.

6. The method of claim 1, where the amine is a cationic polysaccharide, and the ratio of carbon disulfide to the amine groups in the cationic polysaccharide ranges from about 1:1,000,000 to about 100:1.

7. The method of claim 1, where the effective amount of carbon disulfide-modified amine additive added to the aqueous stream ranges from about 10 ppm to about 5000 ppm based on the aqueous stream.

8. The method of claim 1, where the separating further comprises separating at least a portion of the oil from the water in the aqueous stream by a method selected from the group consisting of demulsification, flocculation, gravity settling, electrostatic coalescence, and combinations thereof.

9. The method of claim 1, where the carbon disulfide-modified amine additive is selected from the group consisting of a polymeric dithiocarbamate, a polymeric dithiocarbamic salt, and combinations thereof.

10. The method of claim 1 where the carbon disulfide-modified amine additive comprises at least one hydroxyl group.

11. The method of claim 1 where the aqueous stream is selected from a group consisting of a production fluid, a drilling fluid, a completion fluid, a workover fluid, and combinations thereof.

12. A method for separating oil from water in an aqueous stream comprising oil and water, the method comprising:
    making a carbon disulfide-modified amine additive by a process comprising reacting together in one step:
        an amine, wherein the amine is selected from the group consisting of cationic starch, cationic cellulose, chitin, chitosan, and combinations thereof carbon disulfide; and
        a co-reactant, wherein the co-reactant is an α,β-unsaturated compound selected from the group consisting of methyl acrylate, methyl, methacrylate, ethyl acrylate, 2-ethylhexyl acrylate, acrylonitrile, methyl vinyl ketone, cyclohexenone, chalcone, and combinations thereof;
    optionally in the presence of a base catalyst; and
    introducing an effective amount of the carbon disulfide-modified amine additive to the aqueous stream to separate at least a portion of oil from the water in the aqueous stream; and
    separating at least a portion of oil from the water in the aqueous stream.

* * * * *